(12) United States Patent
Hirunuma et al.

(10) Patent No.: US 6,424,462 B1
(45) Date of Patent: Jul. 23, 2002

(54) BINOCULAR AND METHOD FOR MANUFACTURING THE SAME

(75) Inventors: Ken Hirunuma, Tokyo; Shinji Tsukamoto; Atsushi Denpo, both of Saitama, all of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/699,485

(22) Filed: Oct. 31, 2000

(30) Foreign Application Priority Data

Nov. 2, 1999 (JP) .............................. 11-312908

(51) Int. Cl.[7] .............................................. G02B 23/00
(52) U.S. Cl. ...................... 359/407; 359/421; 359/411; 359/415; 408/1 R
(58) Field of Search .................... 359/410, 415, 359/416, 417, 418, 421, 823, 407, 408, 409, 411, 412; 408/1 R

(56) References Cited

U.S. PATENT DOCUMENTS 2,180,236 A * 11/1939 Heinisch ................ 359/407
3,582,180 A * 6/1971 Gross .................... 359/555
5,973,830 A 10/1999 Ichikawa ................ 359/415

FOREIGN PATENT DOCUMENTS

| JP | 2524225 | 5/1996 |
|---|---|---|
| JP | 10319325 | 12/1998 |

* cited by examiner

*Primary Examiner*—Cassandra Spyrou
*Assistant Examiner*—Christopher S. Maxie
(74) *Attorney, Agent, or Firm*—Greenblum & Bernstein, P.L.C.

(57) ABSTRACT

A mounting base which includes an object side portion, an eyepiece side portion, and a connecting portion. The connecting portion connects the side portions, and the side portions are parallel. A pair of first mounting holes are formed in the object side portion and a pair of second mounting holes are formed in the eyepiece side portion. An axis line, perpendicular to the object side portion, which goes through a geometric center of gravity of one of the first mounting holes is coaxial with an axis line, perpendicular to the eyepiece side portion, which goes through a geometric center of gravity of one of the second mounting holes. Lens barrels of the objective lenses are fixed to the first mounting holes. Eyepiece units, in which the eyepieces are held, are rotatably engaged with the second mounting holes.

15 Claims, 7 Drawing Sheets

BINOCULAR AND METHOD FOR MANUFACTURING THE SAME

BACKGROUND OF THE INVENTION

1. Field of the Invention

This invention relates to a binocular in which an interpupillary adjustment is carried out by a biaxial interlock mechanism.

2. Description of the Related Art

Conventionally, there is known a type of binocular which has an interpupillary adjustment function. The distance between the eyes of different users of binoculars varies. By carrying out the interpupillary adjustment function, a distance between optical axes of a pair of eyepieces can be adjusted so as to suit for the distance between the eyes of any user. There are two types of interpupillary adjustment function. One is a uniaxial type, and the other is a biaxial type.

In the uniaxial type binocular, each of a pair of telescopic optical systems is respectively rotated around an axis, which is parallel to optical axes of the telescopic optical systems and is equal distant from each telescopic optical system. Namely, there is one axis for rotation of the telescopic optical systems in order to adjust the distance between the optical axes of the telescopic optical systems. In the biaxial type binocular, the telescopic optical systems have respective Porro prisms as erector prismatic systems, respective objective optical systems and respective eyepieces whose optical axes are displaced out of alignment with those of the objective optical systems. Each of a pair of eyepieces and Porro prisms are respectively rotated around an optical axis of a corresponding objective optical system and the rotations of the eyepieces are interlocked. Namely, there are two axes of rotation of the eyepieces for adjusting the distance between the optical axes of the eyepieces.

In the biaxial type binocular, the objective optical systems are free of the rotation of the eyepieces at all times. Thus, holding members which hold the objective optical systems and holding members which hold the eyepieces are respectively supported by different supporting members.

In a manufacturing process of binoculars, operations such as centering of the optical axis and an adjustment of direction of optical axes are performed, with respect to optical axes of left and right telescopic optical systems. The centering of the optical axis is a process by which an optical axis of an eyepiece and an optical axis of an objective optical system become coaxial in each of the left and right telescopic optical systems. The adjustment of direction of optical axes is a process by which optical axes of the left and right telescopic optical systems become parallel. These processes are carried out, after the objective optical systems and the eyepieces are respectively mounted on the holding members, for example the lens barrels, and the holding members are assembled.

As described above, in the biaxial binocular, the holding members of the eyepieces with Porro prisms and the objective optical systems are respectively supported by different supporting members. With respect to each of the left and right telescopic optical systems, the manner in which the objective optical system and the eyepiece are held in their holding members should be adjusted such that the above-mentioned centering is achieved. Also, the angular relationship between the holding members should be adjusted so that the optical axes of the left and right telescopic optical systems are parallel. Namely, the adjustment of the positional relationship between the holding members, and the alignment of the positions of the eyepieces and the objective optical systems in the holding members, are achieved simultaneously.

However, a degree of disagreement of the optical axes of the objective lens and the eyepiece subtly varies with each product. Also, the optical axes of the left and right telescopic optical systems are not parallel, subtly varying with each product. As a result, in the manufacturing process of the biaxial type binoculars the above-mentioned adjustments are difficult to achieve requiring a great deal of labor and cost.

SUMMARY OF THE INVENTION

Therefore, an object of the present invention is to provide a biaxial type binocular in which the adjustment of optical axes is facilitated in the manufacturing process.

In accordance with an aspect of the present invention, there is provided a binocular, in which an interpupillary distance is adjusted by rotating each of a pair of eyepieces around corresponding optical axis of optical axes of a pair of objective optical systems, comprising: a pair of rotating members that are rotatable for an interpupillary adjustment, each of the rotating members holding a corresponding eyepiece of the pair of eyepieces; and a mounting base. The mounting base includes a rotating member holding portion that holds the pair of rotating members; an objective optical systems holding portion that holds the pair of objective optical systems; and a connecting portion that is unitarily formed with the rotating member holding portion and the objective optical systems holding portion, connecting the rotating member holding portion and the objective optical systems holding portion such that the rotating member holding portion and the objective optical systems holding portion are parallel.

The rotating member holding portion and the objective optical systems holding portion are a flat board-shaped member.

First openings are formed in the rotating member holding portion. Each of the rotating members is mounted in each of the first openings.

Second openings are formed in the objective optical systems holding portion. Each of the objective optical systems is mounted in each of the second openings.

The first openings and the second openings are formed such that: an axis line, perpendicular to the rotating member holding portion, on which a geometric center of gravity of one first opening of the first openings lies, an axis line, perpendicular to the objective optical systems holding portion, on which a geometric center of gravity of one second opening of the second openings corresponding to the one first opening lies, and an optical axis of one objective optical system of the objective optical systems which is mounted in the one second opening, are coincident; and an axis line, perpendicular to the rotating member holding portion, on which a geometric center of gravity of another first opening of the first openings, an axis line, perpendicular to the objective optical systems holding portion, on which a geometric center of gravity of another second opening of the second openings corresponding to the another first opening, and an optical axis of another objective optical system of the objective optical systems, which is mounted in the another second opening, are coincident.

Preferably, the connecting portion is a flat board-shaped member, which is parallel to a plane perpendicular to the rotation member holding portion and the objective optical systems holding portion.

Preferably, the first openings and the second openings are circularly formed.

Optionally, a radius of the first openings is shorter than a radius of the second openings.

Preferably, movable optical systems are provided in a space between the rotating member holding portion and the objective optical systems holding portion. The movable optical systems are disposed on the connecting portion.

Optionally, the movable optical systems are correcting optical systems which correct a focused image tremble. The movable optical systems is two-dimensionally driven on a plane which is perpendicular to the optical axes thereof.

Optionally, a sectional shape of the mounting base, which is taken along a plane perpendicular to the rotating member holding portion and the objective optical systems holding portion, is almost U-shaped.

In accordance with another aspect of the present invention, there is provided a binocular, which includes a right telescopic optical system and a left telescopic optical system, comprising: a right rotating member that holds a right eyepiece group of the right telescopic optical system and is rotatable around a right optical axis of a right objective system of the right telescopic optical system; a left rotating member that holds a left eyepiece group of the left telescopic optical system and is rotatable around a left optical axis of a left objective system of the left telescopic optical system; and a mounting base that includes a first board holding the right rotating member and the left rotating member, a second board holding the right objective optical system and the left objective optical system, and a third board which is unitarily formed with the first board and the second board and connects the first board and the second board such that the first board and the second board are parallel.

The first board is provided with first circular holes in which the right rotating member and the left rotating member are respectively mounted.

The second board is provide with second circular holes in which the right objective optical system and the left objective optical system are mounted.

The rotational movements of the right rotating member and the left rotating member are interlocked.

A straight line, connecting a center of one of the first circular holes, in which the right rotating member is mounted, and a center of one of the second circular holes, in which the right objective optical system is mounted, is coaxial with the right optical axis; and a straight line, connecting a center of another of the first circular holes, in which the left rotating member is mounted, and a center of another of the second circular holes, in which the left objective optical system is mounted, is coaxial with the left optical axis.

Preferably, the third board is perpendicular to the first board and the second board.

Optionally, a radius of the first circular holes is shorter than a radius of the second circular holes.

Preferably, movable optical systems are provided in a space between the first board and the second board. The movable optical systems are disposed on the third board.

Optionally, the movable optical systems are correcting optical systems which correct a focused image tremble. The movable optical systems are two-dimensionally driven on a plane which is perpendicular to the optical axes thereof.

Preferably, a sectional shape of the mounting base, which is taken along a plane perpendicular to the first board and the second board, is almost U-shaped.

In accordance with another aspect of the present invention, there is provided a method for manufacturing binoculars. The binocular comprises a pair of rotating members that is rotatable for an interpupillary adjustment, and a mounting base.

Each of the rotating members holds a corresponding eyepiece of a pair of eyepieces.

The mounting base includes: a rotating member holding portion that holds the pair of rotating members; an objective optical systems holding portion that holds a pair of objective optical systems; a connecting portion that is unitarily formed with the rotating member holding portion and the objective optical systems holding portion, connecting the rotating member holding portion and the objective optical systems holding portion, such that the rotating member holding portion and the objective optical systems holding portion are parallel. The rotating member holding portion and the objective optical systems holding portion are flat board-shaped members.

The method comprises: a first step of forming openings, in which the pair of objective optical systems is mounted, in the objective optical systems holding portion, by abutting a cutting tool against a surface of the objective optical systems holding portion, while rotating the mounting base around a predetermined axis, the cutting tool being positioned from the predetermined axis by a first distance; and a second step of forming openings, in which the pair of rotating members is mounted, in the rotating member holding portion, by abutting the cutting tool against a surface of the rotating member holding portion while rotating the mounting base around the predetermined axis in a similar condition to the first step, the cutting tool being positioned from the predetermined axis by a second distance.

Preferably, the first distance is greater than the second distance.

In accordance with another aspect of the present invention, there is provide another method for manufacturing binoculars. The binocular comprises: a pair of rotating members that is rotatable for an interpupillary adjustment, each of the rotating members holding a corresponding eyepiece of a pair of eyepieces; and a mounting base. The mounting base includes: a first board-shaped portion that holds the pair of rotating members; a second board-shaped portion that holds a pair of objective optical systems; and a connecting portion that is unitarily formed with the first board-shaped portion and the second board-shaped portion, connecting the first board-shaped portion and the second board-shaped portion, such that the first board-shaped portion and the second board-shaped portion are parallel.

The method comprises: a first step of forming first opening, in one portion of the first board-shaped portion and the second board-shaped portion, by abutting a cutting tool against a surface of the one portion while rotating the mounting base around a predetermined axis; and a second step of forming second opening which is smaller than the first opening, in another portion of the first board-shaped portion and the second board-shaped portion, by abutting the cutting tool against a surface of the another portion while rotating the mounting base around the predetermined axis in a similar condition to the first step.

According to the present invention, the pair of objective optical systems and the pair of rotating members which hold the pair of eyepieces are mounted in a single mounting base. Further, in the left and right telescopic optical systems, the opening in which the rotating member is mounted and the opening in which the objective optical system is mounted are formed such that the axis of the opening of the rotating member and the axis of the opening of the corresponding objective optical system are coaxial with each other. Accordingly, the above-mentioned centering and adjustment of direction of optical axes are achieved only by adjusting the tolerance in processing of each lens of the eyepiece and the objective optical system, after mounting the eyepiece and the objective optical system in the holding members thereof, so that the adjustment of mounting for each lens is facilitated.

Further, as described above, the opening in which the eyepiece is mounted and the opening in which the objective lens is mounted are formed by abutting the cutting tool while rotating the mounting base. The rotational axis of the mounting base is identical, both when the opening for the eyepiece is formed and when the opening for the objective lens is formed. Accordingly, with respect to each of the left and right telescopic optical systems, the axis lines of each opening readily become coaxial.

The movable optical systems, which are mounted on the connecting portion, are not restricted to correcting a focused image tremble. For example, optical systems for carrying out an inner focus, which are movable along the optical axes of the right and left telescopic optical systems, can be provided on the connecting portion.

BRIEF DESCRIPTION OF THE DRAWINGS

The objects and advantages of the present invention will be better understood from the following description, with reference to the accompanying drawings, in which.

DESCRIPTION OF THE PREFERRED EMBODIMENTS

An embodiment according to the present invention will be explained with reference to the figures. Note that a "lengthwise direction" is a direction perpendicular to a plane including two optical axes which are parallel, i.e. a direction perpendicular to a sheet of FIG. 1, and a "lateral direction" is a direction which is parallel to the plane and parallel to an axis perpendicular to the two optical axes, i.e. a horizontal direction in FIG. 1.

Figure 1:
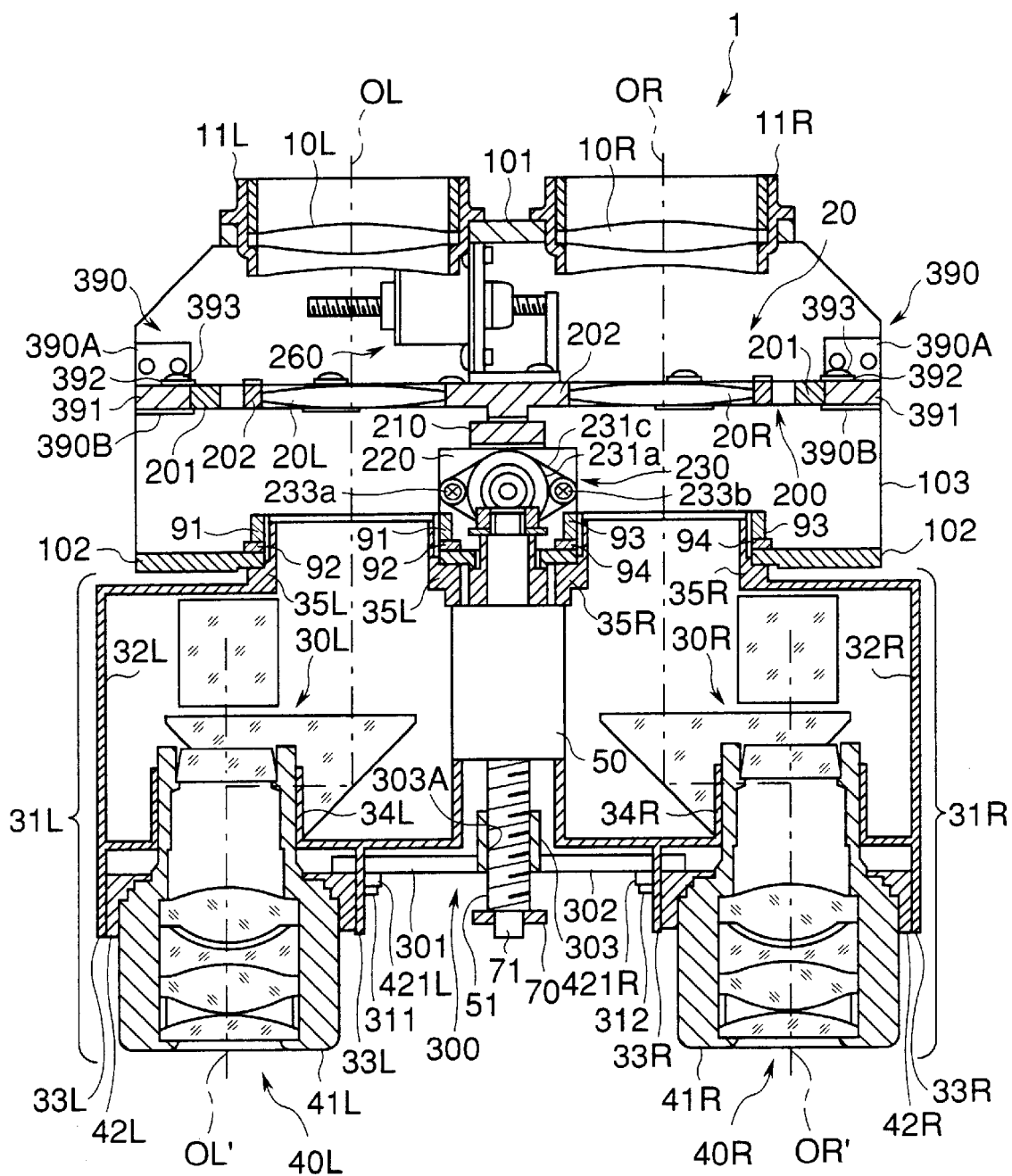
FIG. 1 is view, partially in cross-section of a binocular, to which an embodiment, according to the present invention, is applied, taken along planes including pairs of optical axes.
Figure 2:
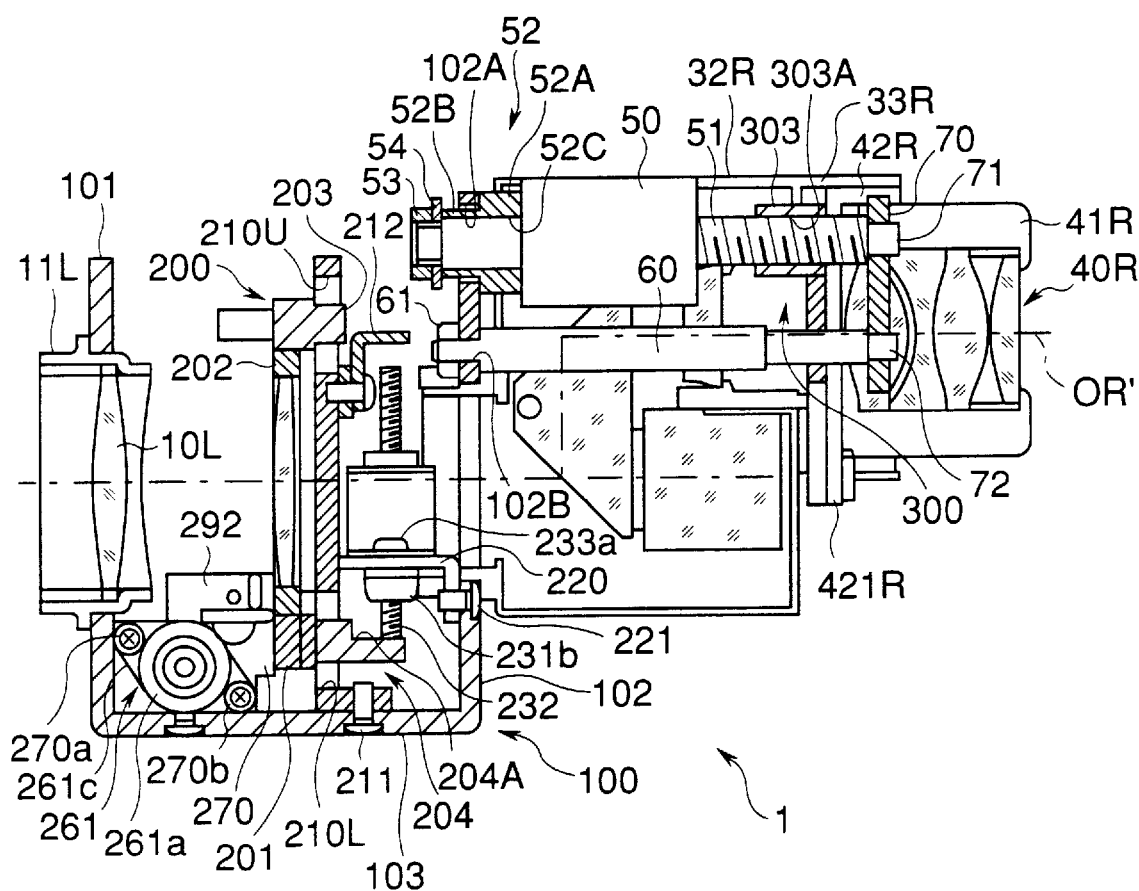
FIG. 2 is a view, partially in cross-section of a central portion of the binocular, taken along a plane perpendicular to the planes including the optical axes.

FIG. 1 is a view of a partial cross-section of a binocular 1, taken along planes that include a pair of optical axes. FIG. 2 is a view, partially in cross-section, viewed from the side of FIG. 1. Some members are omitted in FIGS. 1 and 2 in order to clearly show the construction of the binocular. Further, some members are transparently depicted.

A luminance flux passes a pair of objective lenses 10L and 10R, and is directed to a pair of optical inversion systems 30L and 30R, through a pair of correction lenses 20L and 20R. The luminance flux is directed to a pair of eyepiece groups 40L and 40R, after passing through the pair of optical inversion systems 30L and 30R. Namely, a left telescopic optical system comprises the objective lens 10L, the correction lens 20L, the optical inversion system 30L and the eyepiece group 40L; and a right telescopic optical system comprises the objective lens 10R, the correction lens 20R, the optical inversion system 30R and the eyepiece group 40R. OL is the optical axis of the objective lens 10L, OR is the optical axis of the objective lens 10R, OL' is the optical axis of the eyepiece group 40L, and OR' is the optical axis of the eyepiece group 40R.

The objective lenses 10L and 10R are held by objective lens barrels 11L and 11R respectively. The pair of correction lenses 20L and 20R is held by a single lens holding frame 200, of a focused image tremble correcting device 20. A tremble of the optical axes of the left and right telescopic optical systems, caused by a hand tremble of user when the binocular is utilized, is corrected by the focused image tremble correcting device 20.

An eyepiece unit 31L includes a prism frame 32L and an eyepiece frame 33L. The optical inversion system 30L is disposed in the prism frame 32L. The optical inversion system 30L is a Porro prism, which includes two right-angle prisms, that invert an image thereby producing an erected image. The eyepiece group 40L is held by an eyepiece barrel 41L. The eyepiece barrel 41L is mounted in the eyepiece frame 33L through a holder 42L. The holder 42L is supported by the eyepiece frame 33L in such a manner that the holder 42L is in slidable contact with the inner surface of the eyepiece frame 33L and movable along the optical axis OL'. An eyepiece barrel supporting frame 34L is formed at a position which connects the prism frame 32L and the eyepiece frame 33L. The frame 34L is cylindrical-shaped, extending to the optical inversion system 30L. The frame 34L supports an end portion of the eyepiece barrel 41L which is positioned within the binocular 1 in such a manner that the end portion is in slidable contact with the frame 34L. Movement of the holder 42L along the optical axis OL' is guided by the frame 34L.

Similarly, an eyepiece unit 31R includes a prism frame 32R and an eyepiece frame 33R. The optical inversion system 30R, which is similar to the optical inversion system 30L, is disposed in the prism frame 32R. The eyepiece group 40R is held by an eyepiece barrel 41R. The eyepiece barrel 41R is mounted in the eyepiece frame 33R through a holder 42R. The holder 42R is supported by the eyepiece frame 33R in such a manner that the holder 42R is in slidable contact with the eyepiece frame 33R and movable along the optical axis OR'. An eyepiece barrel supporting frame 34R is formed at a position which connects the prism frame 32R and the eyepiece frame 33R. The frame 34R is cylindrical-shaped, extending to the optical inversion system 30R side. The frame 34R supports an end portion of the eyepiece barrel 41R which is positioned within the binocular 1 in such a manner that the end portion is in slidable contact with the frame 34R. Movement of the holder 42R along the optical axis OR' is guided by the frame 34R.

A mounting frame 35L is formed as part of the prism frame 32L, on the correction lens 20L side. The mounting frame 35L is cylindrical-shaped, extending to the correction lens 20L. Similarly, a mounting frame 35R is formed as part of the prism frame 32R, on the correction lens 20R side. The mounting frame 35R is cylindrical-shaped, extending to the correction lens 20R.

A rotation ring 50, which is cylindrical-shaped, is provided between the prism frames 32L and 32R. The rotation ring 50 is positioned so that the axis thereof is parallel to the optical axes OL, OR, OL' and OR'. A rotation ring axle 51 is fixed to the rotation ring 50. The rotation ring axle 51 rotates in accordance with the rotation of the rotation ring 50. A guide bar 60 (FIG. 2) is provided parallel to the rotation ring 51 and positioned at the base side of the binocular 1, viewed from the rotation ring axle 51, such that an axis thereof extends along the optical axes OL' and OR' (see FIG. 2).

One end portion of the rotation ring axle 51, which is situated at the side of the objective lenses 10L and 10R, is supported by a supporting hole 102A of a mounting base 100. Another end portion of the rotation ring axle 51, which is situated at the side of the eyepiece groups 40L and 40R is fixed to a reinforcement plate 70 by a screw 71. The reinforcement plate 70 is a rectangle-shaped plate which is positioned such that the longitudinal direction thereof is perpendicular to a plane that includes the optical axes OL' and OR'.

One end portion of the guide bar 60, which is situated at the side of the objective lenses 10L and 10R, is supported by a supporting hole 102B of the mounting base 100. Another end portion of the guide bar 60, which is situated at the side of the eyepiece groups 40L and 40R, is fixed by a screw 72, at an end portion of the reinforcement plate 70, opposite to the end portion at which the rotation ring axle 51 is fixed.

Namely, the rotation ring axle 51 and the guide bar 60 are respectively supported by the supporting holes 102A and 102B of the mounting base 100 at the end portions which are situated at the objective lenses 10L and 10R side; and they are supported by the reinforcement plate 70 at the end portions which are situated at the eyepieces 40L and 40R side. Note that the structure for supporting the rotation ring axle 51 and the guide bar 60 in the mounting base 100 will be explained below.

Figure 3:
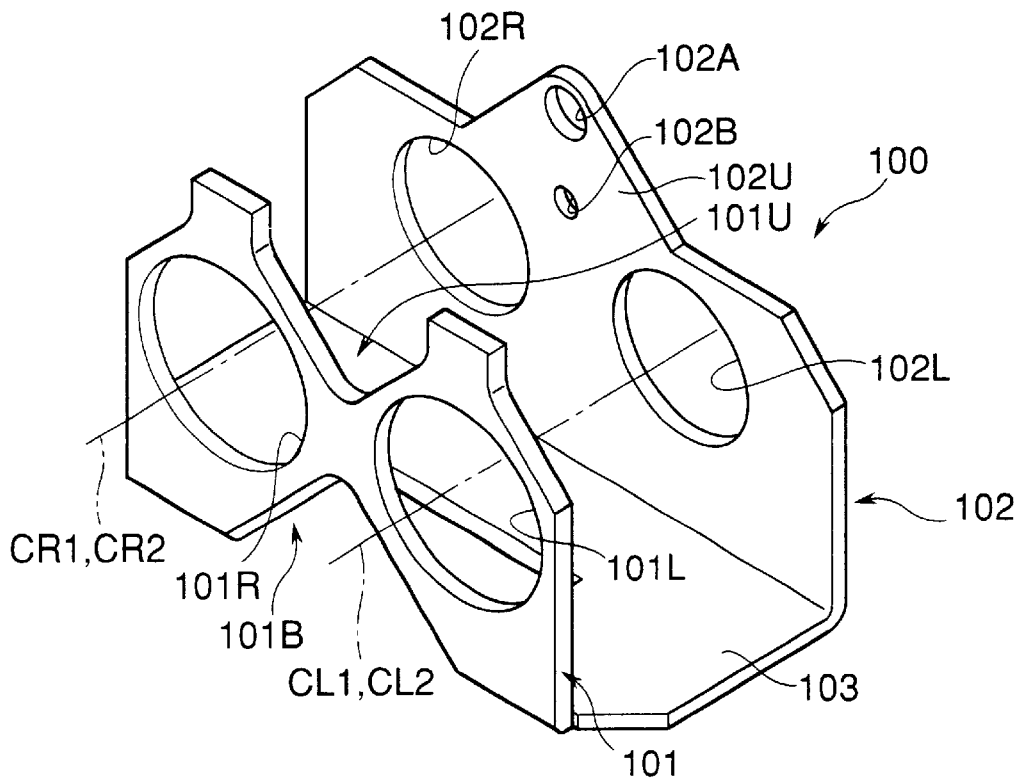
FIG. 3 is a perspective view of a mounting base.

FIG. 3 is a perspective view of the mounting base 100, viewed from the objective lens barrels 11R and 11L side. The mounting base 100 is provided with: an object side holding portion 101 (objective optical systems holding portion); an eyepiece side holding portion 102 (rotating member holding portion); and a connecting portion 103. The object side holding portion 101 holds the objective lens barrels 11R and 11L. The eyepiece side holding portion 102 holds the eyepiece units 31L and 31R. The connecting portion 103 connects the object side holding portion 101 and the eyepiece side holding portion 102. The portions 101, 102 and 103 are board-shaped and unitarily formed, such that the portions 101 and 102 are parallel and the portion 103 is perpendicular to the holding portions 101 and 102. Namely, a sectional shape of the mounting base 100, taken from a plane perpendicular to the plane including the optical axes OL and OR, is almost "U"-shaped (see FIG. 2).

A cut-out-portion 101U is formed at a center portion of the upper side of the holding portion 101 and similarly a cut-out-portion 101B is formed at a center portion of the lower side of the holding portion 101. In other words, the center portions of the upper and lower sides of the holding portion 101 are partially cut out in a triangle shape, such that a vertex of the triangle shape extends toward the center point of the holding portion 101.

Mounting holes 101L and 101R, which are circular, are formed in the holding portion 101. The mounting holes 101L and 101R are positioned symmetrically about the cut-out-portions 101U and 101B. The objective lens barrel 11L is fixed to the mounting hole 101L and the objective lens barrel 11R is fixed to the mounting hole 101R.

A rotation ring axle supporting portion 102U is formed at a center position of the upper side of the holding portion 102. The supporting portion 102U is unitarily formed with the holding portion 102, in a triangle shape. A vertex of the triangle shape extends away from the connecting portion 103. The supporting portion 102U is positioned so that an axis, on which the vertex of the supporting portion 102U lies, is extended in a direction perpendicular to the connecting portion 103 and includes the center point of the holding portion 102.

Mounting holes 102L and 102R, which are circular-shaped, are formed in the holding portion 102. The mounting holes 102L, 102R are positioned symmetrically about the axis of the vertex of the holding portion 102U. The mounting frame 35L of the eyepiece unit 31L is rotatably engaged with the mounting hole 102L and the mounting frame 35R of the eyepiece unit 31R is rotatably engaged with the mounting hole 102R.

Further, the supporting hole 102A, which supports the rotation ring axle 51, is formed adjacent the vertex of the supporting portion 102U. The supporting hole 102B, which supports the guide bar 60, is formed adjacent the base of the supporting portion 102U. The holes 102A and 102B are positioned such that a straight line connecting center points of the holes 102A, 102B is perpendicular to the connecting portion 103.

Figure 4:
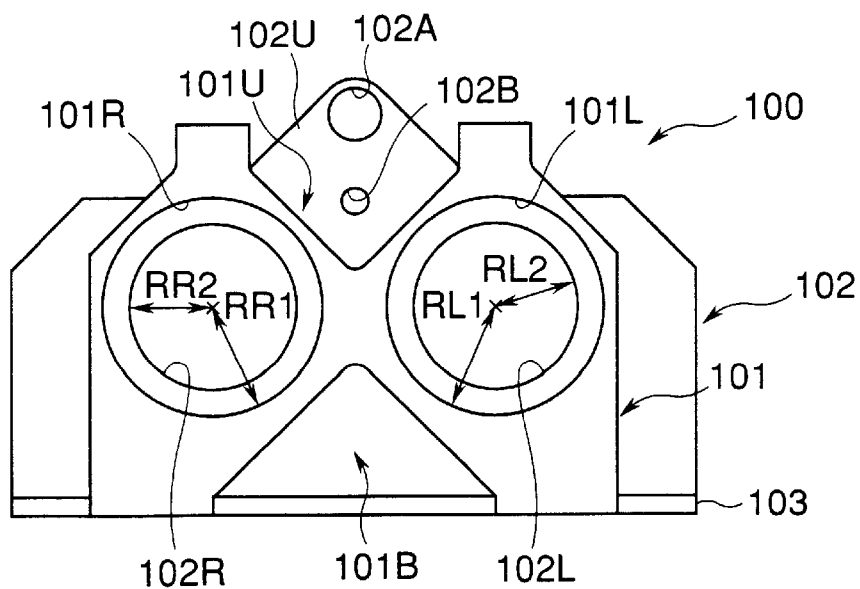
FIG. 4 is a front view of the mounting base.

FIG. 4 is a front view of the mounting base 100, viewed from the object side holding portion 101. A radius RL1 of the mounting hole 101L is greater than the radius RL2 of the mounting hole 102L, and the center points of the mounting holes 101L, 102L are concentric. Similarly, a radius RR1 of the mounting hole 101R is greater than the radius RR2 of the mounting hole 102R and the center points of the mounting holes 101R, 102R are concentric.

As described above, the holding portions 101 and 102 are parallel. Accordingly, the mounting holes 101L, 101R, 102L and 102R are formed, such that an axis line CL1 of the mounting hole 101L and an axis line CL2 of the mounting hole 102L are coaxial, and an axis line CR1 of the mounting hole 101R and an axis line CR2 of the mounting hole 102R are coaxial.

Note that: the axis line CL1 includes a geometric center of gravity of the mounting hole 101L which is a circular opening, and is perpendicular to the holding portion 101; the axis line CL2 includes a geometric center of gravity of the mounting hole 102L which is a circular opening, and is perpendicular to the holding portion 102; the axis line CR1 includes a geometric center of gravity of the mounting hole 101R which is a circular opening, and is perpendicular to the holding portion 101; and the axis line CR2 includes a geometric center of gravity of the mounting hole 102R which is a circular opening, and is perpendicular to the holding portion 102. Further, note that the geometric center of gravity of a hole corresponds to the geometric center of gravity of a portion which is removed by a perforation process as described below.

In other words, a straight line connecting center points of the mounting holes 101L and 102L is coaxial with the optical axis OL of the objective lens 10L which is mounted in the mounting hole 101L, and a straight line connecting center points of the mounting holes 101R and 102R, is coaxial with the optical axis OR of the objective lens 10R.

The eyepiece units 31L and 31R are mounted in the mounting base 100 as described below. Threads are formed on the outer surface of the mounting frame 35L of the eyepiece unit 31L. A nut 91 is engaged with the end portion of the mounting frame 35L (see FIG. 1). A washer 92 is disposed between the nut 91 and the inner surface of the holding portion 102, which faces toward the objective lenses 10L, 10R. Accordingly, the mounting frame 35L is rotatable around the optical axis OL, prevented from moving along the optical axis OL by the nut 91 and the shoulder portion of the mounting frame 35L. Similarly, threads are formed on the outer surface of the mounting frame 35R of the eyepiece unit 31L. A nut 93 is engaged with the end portion of the mounting frame 35R. A washer 94 is disposed between the nut 93 and the inner surface of the holding portion 102, which faces toward the objective lenses 10L, 10R. Accordingly, the mounting frame 35R is rotatable around the optical axis OR, and prevented from moving along the optical axis OR by the nut 93 and the shoulder portion of the mounting frame 35R.

Note that, a locking screw (not shown) is provided on the outer surface of the nuts 91 and 93, so that the nuts 91 and 93 are prevented from moving along the optical axes OL and OR. Accordingly, the engagement between the nuts 91, 93 and the mounting frames 35L, 35R is maintained.

Further, the rotation ring axle 51 and the guide bar 60 are mounted in the mounting base 100 as follows. A holder 52, which is cylindrical-shaped, is provided with a large diameter portion 52A and a small diameter portion 52B (see FIG. 2). Threads are formed on the outer surface of the small diameter portion 52B, and a female thread is formed on the inner surface of the supporting hole 102A, so that the small diameter portion 52B is screwed into the supporting hole 102A. A shoulder of the large diameter portion 52A, situated at the small diameter portion 52B side, is in contact with a surface of the eyepiece side holding portion 102, situated at the eyepiece group 40L and 40R side. Namely, the holder 52 is fixed by the supporting hole 102A. A bearing 52C is formed within the holder 52, parallel and concentric to the large diameter portion 52A and the small diameter portion 52B. The rotation ring axle 51 is installed through the bearing 52C, and rotates about the axis thereof.

An end portion of the rotation ring axle 51, situated at the objective lenses 10L and 10R side, is formed such that its diameter is smaller than that of the remainder of the rotation ring axle 51. Threads are formed on the outer surface of the end portion of the rotation ring axle 51. A nut 53 is engaged with the end portion and a washer 54 is disposed between the nut 53 and a shoulder of the remainder of the rotation ring axle 51, the diameter of which is larger than the diameter of the threaded end portion. Accordingly, the rotation ring axle 51 can rotate about the axis thereof, and the movement of the rotation ring axle 51 along the axis is restrained.

An end portion of the guide bar 60, situated at the objective lenses 10L and 10R side, is formed such that its diameter is smaller than that of the main portion of the guide bar 60. Threads are formed on the outer surface of the end portion of the guide bar 60. The end portion is installed through the supporting hole 102B which is formed in the rotation ring axle supporting portion 102U of the holding portion 102 of the mounting base 100. Further, the main portion of the guide bar 60, the diameter of which is larger than that of the end portion, has a shoulder which is perpendicular to the optical axis OR. The shoulder is in contact with the surface of the holding portion 102, situated at the eyepiece group 40L, 40R side. In this condition, a nut 61 is engaged with the end portion of the guide bar 60, so that the guide bar 60 is fixed within the supporting hole 102B.

As described above, the end portions of the rotation ring axle 51 and the guide bar 60, situated at the objective lenses 10L, 10R side, are respectively fixed to the supporting holes 102A and 102B and the opposite end portions of the rotation ring axle 51 and the guide bar 60, situated at the eyepiece group 40L, 40R side, are fixed to the reinforcement plate 70, such that they do not move in an axial direction, namely, the movement along the optical axes OL and OR, is restrained.

Figure 5:
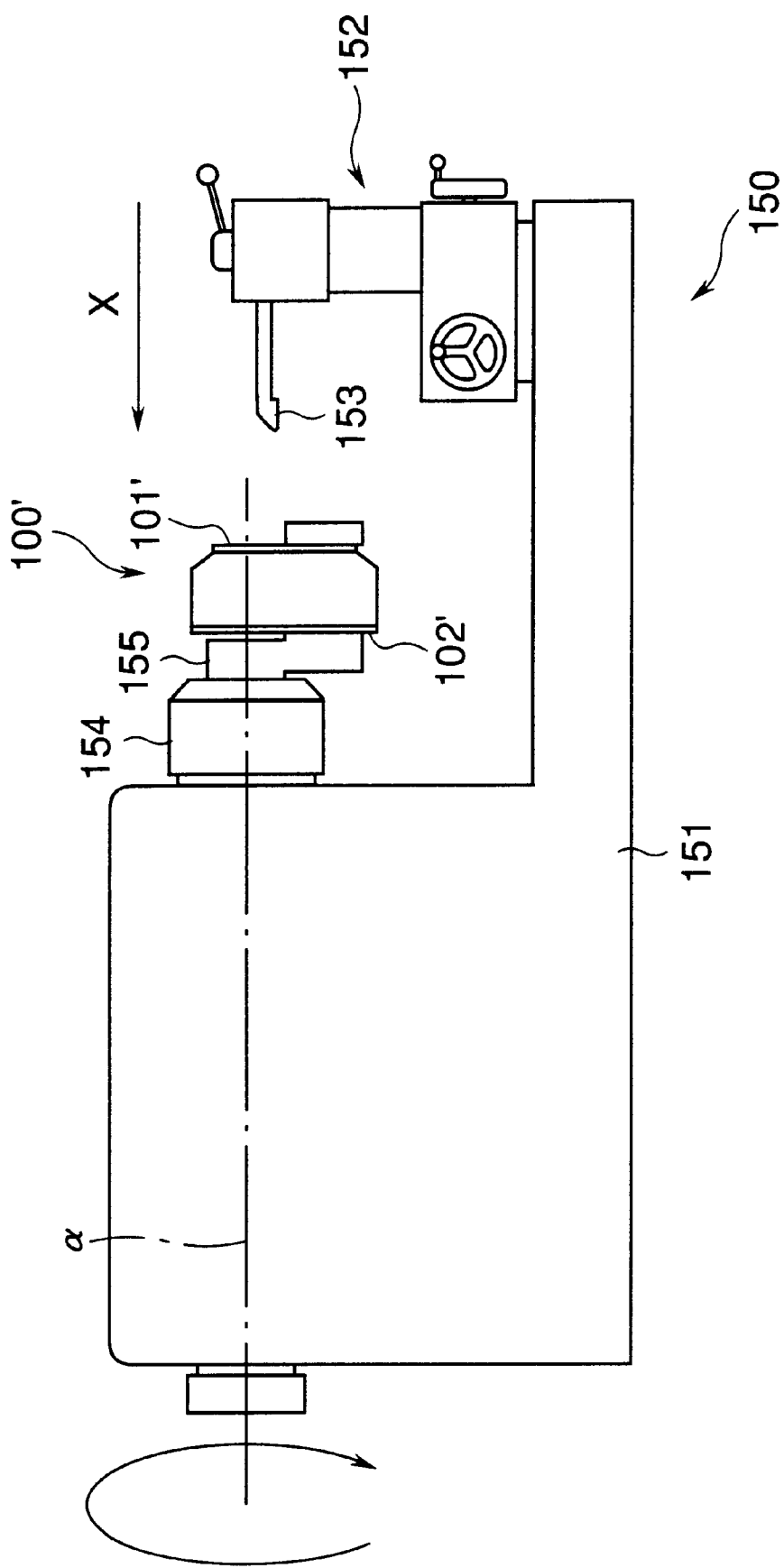
FIG. 5 is view, showing one process of manufacturing the mounting base.

A method for forming the mounting holes 101L, 101R, 102L and 102R will be explained. FIG. 5 schematically shows a lathe turning machine 150 in which an unfinished work 100' is set. The unfinished work 100' is identical to the above-mentioned mounting base 101, with respect to external form and dimensions. A carriage 152 is provided on a bed 151 of the lathe turning machine 150. A cutting tool 153 is installed on the carriage 152. A chuck 154 is coaxially fixed to a spindle (omitted in FIG. 5) which is mounted in the bed 151, so that the chuck 154 rotates around an axis α of the spindle in accordance with the rotation of the spindle. A jig 155 is fixed to the chuck 154, and the unfinished work 100' is set to the jig 155. Accordingly, the unfinished work 100' is rotated around the axis α through the jig 155, in accordance with the rotation of the chuck 154. The unfinished work 100' is set to the jig 155 in such a manner that the axis α is perpendicular to both of a plane portion 101' and 102'. Note that, the plane portion 101' corresponds to the object side holding portion 101, and the plane portion 102' corresponds to the eyepiece side holding portion 102.

A position of the cutting tool 153 is adjusted so that a distance between a tip of the cutting tool 153 and the axis a on a plane perpendicular to the axis α equals the radius RL1 (see FIG. 4) of the mounting hole 101. In a condition that the unfinished work 100' is set to the jig 155, the carriage 152 is moved in a direction X, rotating the spindle at a high speed, and the cutting tool 153 is abutted against the plane portion 101'. Consequently, a hole is formed in the plane portion 101', a radius of which equals the radius RL1 of the mounting hole 101L.

Then, keeping the positional relationship between the carriage 152 and the unfinished work 100', namely keeping the chuck 154 and the jig 155 fixed similarly, the position of the cutting tool 153 is adjusted so that the above-mentioned distance between the tip of the cutting tool 153 and the axis a equals the radius RL2 (see FIG. 4) of the mounting hole 102L. The carriage 152 is further moved in the direction X, rotating the spindle at a high speed, and the cutting tool 153 is abutted against the plane portion 102'. Consequently, a hole is formed in the plane portion 102', a radius of which equals the radius RL2 of the mounting hole 102L.

Namely, the hole, which has a relatively large radius, is formed in the plane portion 101' at first, then consecutively the hole, which has a smaller radius than the radius of the hole of the plane portion 101', is formed in the plane portion 102'.

After the holes respectively corresponding to the mounting holes 101L, 102L are formed, the rotation of the spindle is stopped, and the carriage 152 is moved to the original position. The unfinished work 100' is reset to the jig 155 such that the axis a is perpendicular to areas of the plane portions 101', 102', in which a hole is not formed. Then, the above-mentioned processes are repeated. Consequently, a hole is formed in the plane portion 101', a radius of which equals the radius RR1 of the mounting hole 101R, and a hole is formed in the plane portion 102', a radius of which equals the radius RR2 of the mounting hole 102R.

As described above, after the process of the plane portion 101' is finished, the process of the plane portion 102' is started without removing the chuck 154 and the jig 155, so that both processes of the plane portions 101', 102' are carried out in such a manner that the unfinished work 100' is being rotated around the same axis α. Accordingly, with respect to the holes which are formed on a same side of the plane portions 101', 102', viewed from the center of the unfinished work 100', center points of the holes are concentric in a front view of the unfinished work 100'.

By forming the holes in the unfinished work 100' using the above-mentioned processes, such mounting base as shown in FIGS. 3 and 4 can be obtained.

Note that, the position of the carriage 152 in the direction perpendicular to the sheet of FIG. 5 is appropriately adjusted, such that the positional relationship between the two holes formed in the plane portion 101' is similar to the positional relationship between the mounting holes 101L, 101R of the holding portion 101, and the positional relationship between the two holes formed in the plane portion 102' is similar to the positional relationship between the mounting holes 102L, 102R of the holding portion 101.

Under the above-mentioned processes, after the holes are formed in the plane 101', the holes are formed in the plane 102'. However, the order of the processes can be changed. For example, if a design of the binocular requires that the radius of the hole 102 is greater than the radius of the hole 101, after the forming of the holes in the plane 102' is carried out, the forming of the holes in the plane 101' can be carried out. Namely, a hole a radius of which is relatively larger is formed first.

Figure 6:
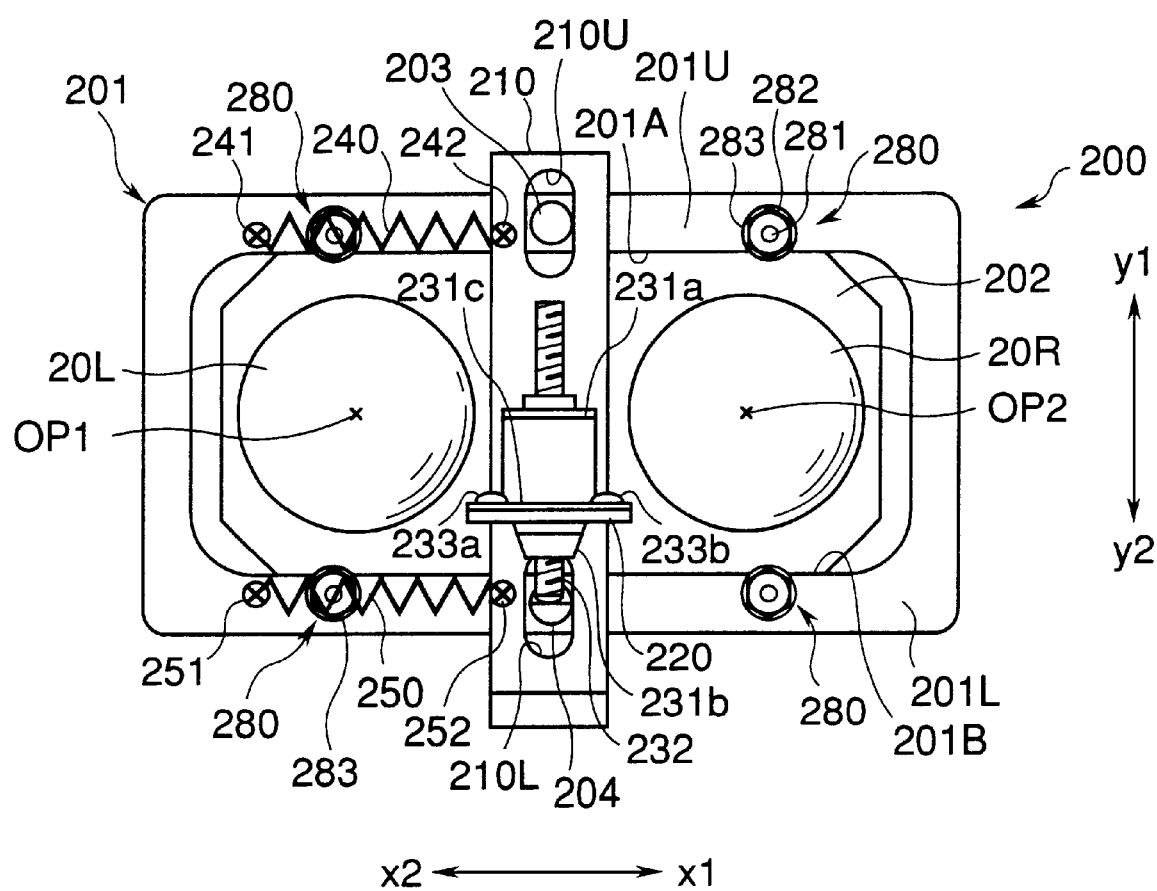
FIG. 6 is a front view of a focused image tremble correcting vice which is mounted on the mounting base, viewed from the side of eyepieces.
Figure 7:
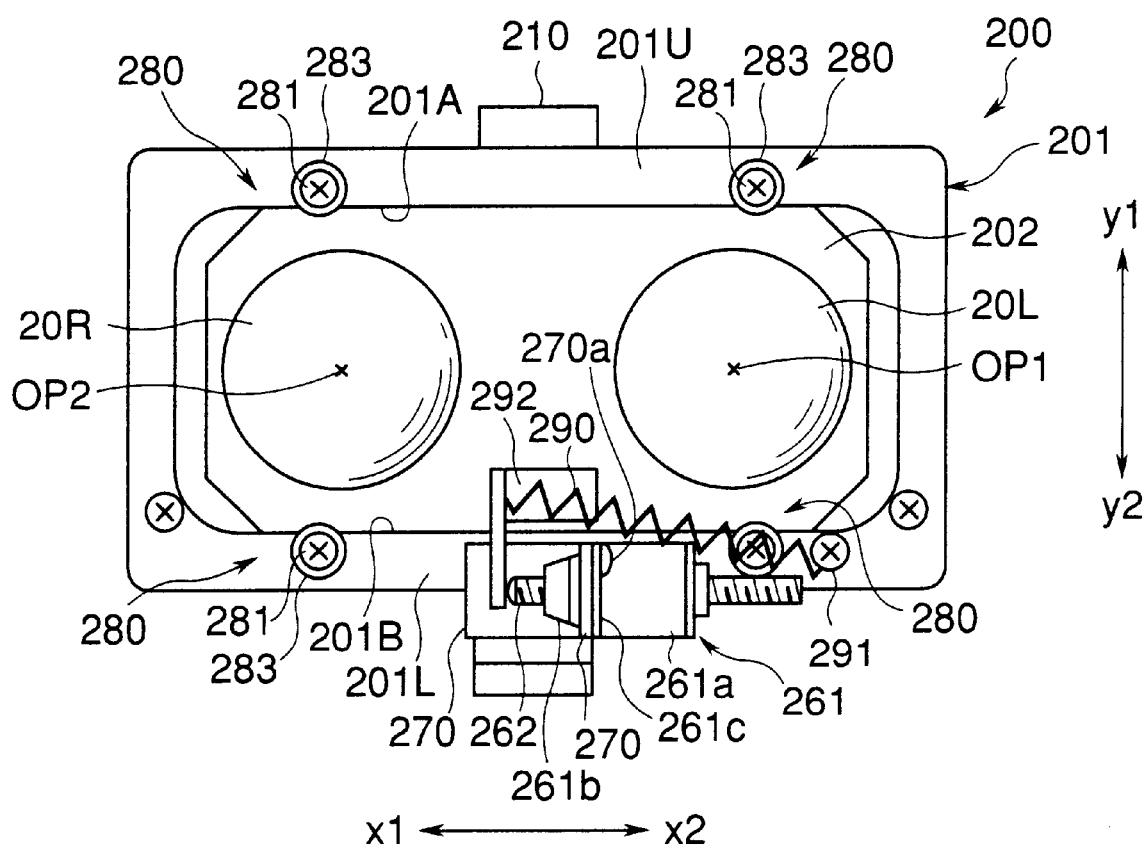
FIG. 7 is a front view of the focused image tremble correcting device which is mounted on the mounting base, viewed from the side of objective lenses.

FIGS. 6 and 7 are front views showing a main part of the focused image tremble correcting device 20. In FIG. 6, the main part is viewed from the eyepiece side holding portion 102 of the mounting base 100, and in FIG. 7, the main part is viewed from the object side holding portion 101 of the mounting base 100.

A correction lenses holding frame 200 includes a lengthwise-direction driving frame 201 and a lateral-direction driving frame 202. The lengthwise-direction driving frame 201 is a flat board, being approximately rectangular. A through-hole opening is formed in the center of the driving frame 201. Namely, the driving frame 201 is a doughnut-shaped board. In the through-hole opening, the inner wall 201A and inner wall 201B are parallel.

The lateral-direction driving frame 202 is disposed in the through-hole opening. The driving frame 202 is a flat and approximately rectangular board. The driving frame 202 unitarily holds correction lenses 20L and 20R which are identical in weight and shape. The driving frames 201 and 201 are formed such that the thickness of the driving frames 201, 202 in a direction parallel to optical axes of the correction lenses 20L, 20R are identical(see FIGS. 1, 2).

A drive supporting board 210, a longitudinal direction of which is parallel to the lengthwise direction, is a flat board. The drive supporting board 210 is fixed on the connecting portion 103 of the mounting base 100 by a screw 211 (see FIG. 2). The correction lenses holding frame 200 and the drive supporting board 210 are positioned in the binocular 1, such that the drive supporting board 210 is situated at an approximate center position of the correction lens holding frame 200, namely a position between the correction lenses 20L and 20R.

A guide hole 210U is formed at a position in the drive supporting board 210, corresponding to the upper edge portion 201U of the lengthwise-direction driving frame 201. A guide hole 210L is formed at a position of the drive supporting board 210, corresponding to the lower edge portion 201L.

A guide pin 203 and a guide pin 204 are respectively provided on the upper edge portion 201U and the lower edge portion 201L. The guide pin 203 is disposed at an approximate center position of the upper edge portion 201U in the lateral direction. Similarly, the guide pin 204 is disposed at an approximate center position of the lower edge portion 201L in the lateral direction. The guide pins 203 and 204 are cylindrically shaped and project to the eyepiece groups 40L, 40R side.

The outer diameter of the guide pin 203 is slightly smaller than the width of the guide hole 210U in the lateral direction, and the outer diameter of the guide pin 204 is slightly smaller than the width of the guide hole 210L in the lateral direction. Accordingly, the guide pins 203 and 204 respectively protrude into guide holes 210U and 210L, being slidable in the lengthwise direction.

A sectional figure of the tip of the guide pin 204, cut along a plane perpendicular to the optical axes OP1, OP2 of the correction lenses 20L, 20R, has a half-moon-shaped figure. The guide pin 204 projects toward the side of the eyepiece groups 40L, 40R, in such a manner that a flat surface 204A is parallel to the lateral direction and faces in a direction y1.

A coil spring 240 is mounted on the upper edge portion 201U of the driving frame 201, at the side of the correction lens 20L. Both ends of the coil spring 240 are hook-shaped. One end is hooked on a screw 241 which is engaged with the upper edge portion 201U close to an upper corner thereof, at the correction lens 20L side. The other end is hooked on a screw 242 which is engaged with the drive supporting board 210 close to the guide hole 210U.

Similarly, a coil spring 250 is mounted on the lower edge portion 201L of the driving frame 201, at the side of the correction lens 20L. Both ends of the coil spring 250 are hook-shaped. One end is hooked on a screw 251 which is engaged with the lower edge portion 201L close to an lower corner thereof, at the correction lens 20L side. The other end is hooked on a screw 252 which is engaged with the drive supporting board 210 close to the guide hole 210L.

Namely, the coil springs 240, 250 urge the lengthwise-direction driving frame 201 in a direction x1 at all times. Accordingly, the guide pin 203 is in contact with an inner wall of the guide hole 210U, on the correction lens 20R side, at all times, and the guide pin 204 is in contact with an inner wall of the guide hole 210L, on the correction lens 20R side, at all times.

Each of the guide pins 203 and 204 are to a large extent lighter and smaller than the frames 201, 202. Accordingly, the center of gravity of the correction lenses supporting frame 200 is positioned at the center of the width of the frame 202, in a direction parallel to the optical axes OP1, OP2 of the correction lenses 20L, 20R.

An intersecting point (omitted in FIGS. 6 and 7) of a straight line, parallel to the optical axes OP1 and OP2, on which the center of gravity lies and the surface of the drive supporting board 210, exists on a straight line connecting a contacting point of the guide pin 203 and the guide hole 210U, and a contacting point of the guide pin 204 and the guide hole 210L. The intersecting point is positioned close to the center point of the frame 202 in the lengthwise direction.

The guide holes 201U and 201L are identical with respect to shape and dimension, and are positioned symmetrically about a straight line parallel to the lateral direction, on which the above-mentioned intersecting point lies. When the binocular 1 is utilized, in a condition where the guide pins 203 and 204 are respectively situated at a center of the guide holes 210U and 210L, the optical axes OP1 and OP2 are respectively coaxial with the optical axes OL and OR of the objective lenses 10L and 10R.

A pedestal 220 is an L-shaped board. The pedestal 220 is fixed by a screw 221 to the surface of the holding portion 102 of the mounting base 100, the surface which faces the holding portion 101.

A lengthwise-direction actuator, generally indicated by reference 230 (see FIG. 1), includes a stepping motor 231 and a shaft 232. The stepping motor 231 includes a motor case 231a and a motor 231b which is mounted in the motor case 231a. The motor 231b can rotate in forward and reverse directions around a lengthwise direction axis. The motor case 231a is fixed to the pedestal 220. The motor 231b projects through a hole (omitted in FIGS. 6) formed in the pedestal 220, projecting in a direction y2. The shaft 232 is supported so as to be unitarily rotatable with the rotational movement of the motor 231b and movable along the longitudinal axis thereof.

Threads are formed on the outer surface of the shaft 232, and the shaft 232 is engaged with a female thread (omitted in FIG. 6) formed on the inner surface of a quill of the motor case 231a. Namely, the shaft 232 rotatably extends or retracts in the longitudinal direction, in accordance with the rotational direction, forward and reverse, of the motor 231b. A ball is mounted on the tip of the shaft 232. The ball of the shaft 232 abuts the flat surface 204A of the guide pin 204.

Coil springs (omitted in FIGS. 6 and 7) are mounted on both of the side edge portions of the driving frame 201. One end of each coil spring is fixed on the driving frame 201, and another end of each coil spring is fixed to an inner surface (omitted in FIGS. 6 and 7) of the binocular 1. The coil springs cause the ball of the shaft 232 of the actuator 230 to abut the flat surface 204A of the guide pin 204 at all times (see FIGS. 2 and 6).

A lateral-direction actuator, generally indicated by reference 260, is placed at a portion close to the lower side of the driving frames 201 and 202, on the objective lenses 10L, 10R side, being also disposed on the correction lens 20L side viewed from the center axis of the driving frames 201 and 202 along the lengthwise direction (see FIGS. 1, 2 and 7). The lateral-direction actuator 260 includes a stepping motor 261 and a shaft 262. The stepping motor 261 includes a motor case 261a and a motor 261b, which is mounted in the motor case 261a.

The motor 261b can rotate in forward and reverse directions around a lateral direction axis. The shaft 262 is supported so as to be unitarily rotatable with the rotational movement of the motor 261b and movable along the longitudinal axis thereof. Threads are formed on the outer surface of the shaft 262, and the shaft 262 is engaged with a female thread (omitted in FIGS. 7) formed on the inner surface of a quill of the motor case 261a. Namely, the shaft 262 rotatably extends or retracts in the longitudinal direction, in accordance with the rotational direction, forward and reverse, of the motor 261b. A ball is mounted on the tip of the shaft 262, which presses a pressed object.

As shown in FIG. 7, a coil spring 290 is disposed close to the lower edge portion 201L of the driving frame 201. Both ends of the coil spring 390 are hook-shaped, similar to the other coil springs. One end is hooked on a screw 291 which is engaged in a portion close to the corner of the driving frame 201 defined by the lower edge portion 201L and the side edge portion of the driving frame 201 close to the correction lens 20L. The other end is hooked in a hole in a pressed board 292 which is fixed to a central position of the driving frame 202, at the lower side thereof. Namely, the coil spring 290 urges the pressed board 292 in the direction x2. Accordingly, the ball of the shaft 262 abuts the pressed board 292 at all times.

As shown in FIG. 2, a flange 261c, generally lozenge-shaped, is unitarily formed at one end of the motor case 261a of the stepping motor 261. The flange 261c is fixed on a fixing board 270 by a screw 270a and a screw 270b which is placed at the opposite side to the screw 270a with the motor case 261a therebetween. The fixing board 270 is fixed on the lower edge portion 201L of the driving frame 201. Namely, the motor case 261a is fixed to the driving frame 201 through the flange 261c and the fixing board 270.

As shown in FIG. 1, a flange 231c, generally lozenge-shaped, is unitarily formed at one end of the motor case 231a of the stepping motor 231. The flange 231c is held on the pedestal 220 by a screw 233a and a screw 233b, which is placed at the opposite side to the screw 233a with respect to the motor case 231a. Namely, the motor case 231a is fixed to the mounting base 100 through the flange 231c and the pedestal 220.

Further, as shown in FIG. 1, a driving frame supporting member 390 is disposed on the connecting portion 103 of the mounting base 100, being positioned close to both side edges of the driving frame 201. The supporting member 390 includes a fixing portion 390A which is fixed on the connecting portion 103 and a supporting portion 390B which extends in a direction perpendicular to the fixing portion 390A. A leading board 391 is fixed on the supporting portion 390B. With respect to a thickness along the optical axes OL and OR, the leading board 391 has approximately the same dimension as the driving frame 201. Side end surfaces of the leading board 391 extend in a direction perpendicular to the connecting portion 103 of the mounting base 100. Both side end surfaces of the driving frame 201 are respectively in contact with the corresponding side end surface of the leading board 391, being slidable in a direction perpendicular to the connecting portion 103.

When the motor 231b rotates in the forward direction, the shaft 232 extends in the direction y2 rotating, against the urging force of the above-mentioned coil spring (omitted in FIGS. 1, 2 and 6). The movement of the shaft 232 in the direction y2 is transmitted to the driving frame 201 though the guide pin 204. As described above, the driving frame 201 is supported at both side ends by the leading boards 391 so as to be slidable. Accordingly, the driving frame 201 is driven in the direction y2 in accordance with the forward rotation of the motor 231b, against the urging force of the spring coil in the direction y1 (see FIG. 6). On the other hand, when the motor 231b rotates in the reverse direction, the shaft 232 retracts in the direction y1 rotating, so that the driving frame 201 is driven in the direction y1 by the urging force of the coil spring in the direction y1.

When the motor 261b rotates in the forward direction, the shaft 262 extends in the direction x1 rotating, against the urging force of the coil spring 290. The movement of the shaft 262 in the direction x1 is transmitted to the driving frame 202 though the pressed board 292. As described above, the driving frame 202 is supported by the driving frame 201 so as to be slidable. Accordingly, the driving frame 202 is driven in the direction x1 in accordance with the forward rotation of the motor 261b, against the urging force of the coil spring 290 in the direction x2 (see FIG. 7). On the other hand, when the motor 261b rotates in the reverse direction, the shaft 262 retracts in the direction x2 rotating, so that the driving frame 202 is driven in the direction x2 by the urging force of the coil spring 290 in the direction x2.

When a switch button (not shown), with which the binocular 1 is provided, is pressed by a user, a correcting operation of a focused image tremble is started with the focused image tremble correcting device 20. Note that, when the correcting operation is started, the driving frames 201 and 201 are situated such that the optical axis OP1 of the correction lens 20L is coaxial with the optical axis OL of the objective lens 10L and the optical axis OP2 of the correction lens 20R is coaxial with the optical axis OR of the objective lens 10R. In this situation, the position of the optical axes of the left and right telescopic optical systems is referred to herein as an original position.

With respect to the lengthwise and lateral directions, angular speeds of trembling of the optical axes of the left and right telescopic optical systems is detected by angular speed sensors, for example gyro sensors (not shown). The angular speeds are respectively integrated, so that angular positions of the optical axes are calculated. The difference between the original position and each of the calculated angular positions is calculated, with respect to the lengthwise and lateral directions.

Further, driving amounts of the lengthwise-direction actuator 230 and the lateral-direction actuator 260, i.e., driving step numbers of the motors 231b and 261b are calculated so that the correction lenses 20L and 20R are moved in order to cancel the differences. The motors 231b and 261b are driven based on the calculated driving step numbers and the driving frames 201 and 202 are respectively moved in the lengthwise and lateral directions so that the tremble of the optical axes is corrected.

Note that, screws 393 are fixed to the leading board 391 by washers 392 (see FIG. 1). The washers 392 and the screws 393 are positioned such that a part of the circumference of each of the washers 392 overlaps the driving frame 201. Further, the length of the supporting portion 390B is longer than the length of the leading board 391, in a direction perpendicular to the optical axes OL, OR, so that a part of the supporting portion 390B overlaps the driving frame 201. Namely, a perimeter portion of the driving frame 201 is lightly clamped by the circumference of the washers 392 and the side edge portion of the supporting portion 390B, so that the driving frame 201 is partially interposed between the washers 392 and the supporting portion 390B at the side end portions thereof. Accordingly, movement of the driving frame 201 parallel to the optical axes OP1 and OP2 is restrained, being guided in the lengthwise direction when driven.

Further, a supporting member 280 includes a screw 281, a nut 282 and a pair of washers 283 (see FIG. 6 and 7). Threads are formed on the outer surface of the shaft of the screw 281. The shaft is received by a hole (omitted in FIGS. 6 and 7) formed in the driving frame 201 and pierces the driving frame 201. The nut 282 is threadably engaged with the free end of the shaft, opposite a head of the screw 281. One of the pair of washers 283 is disposed between the head of the screw 281 and the driving frame 201, and another of the pair of washers 283 is disposed between the nut 282 and the driving frame 201. The pair of washers 283 is positioned adjacent the driving frame 202.

The pair of washers 283 is respectively disposed on planes that include both side surfaces of the driving frame 201 and are perpendicular to the optical axes OP1 and OP2. Each washer 323 is disposed close to the driving frame 202, in such a manner that one portion of each washer 283 overlaps the driving frame 202. Namely, a perimeter portion of the driving frame 202 is lightly clamped by the pair of washers 283, so that the frame 202 is partially interposed between the pair of washers 283. Accordingly, movement of the driving frame 202 parallel to the optical axes OP1 and OP2 is restrained, being guided in the lateral direction when driven.

Further, a shaft stopper 212 is fixed on the drive supporting board 210 by a screw, close to the lower portion of the guide hole 210U (see FIG. 2). The shaft stopper 212 is a board, including a fixing portion parallel to the driving supporting board 210 and a stopping portion which is unitarily formed with the fixing portion and extends in the direction perpendicular to the fixing portion. Namely, the shaft stopper 212 is 'L' shaped. The shaft stopper 212 is situated in such a manner that the stopping portion faces the free end of the shaft 232 of the actuator 230, opposite to the end abutting the guide pin 204.

Further, the stopping portion is situated to be higher than a limit position of the free end when the shaft 232 retracts fully in the above-mentioned tremble correcting operation. Accordingly, if an external force is unexpectedly applied to the binocular 1, the shaft 232 is prevented from moving upward beyond the limit position, and engagement between the threads of the shaft 232 and the female thread of the motor case 231a is maintained.

As shown in FIGS. 1 and 2, a connecting bar 300 is disposed between the eyepiece units 31L and 31R. The connecting member 30 is positioned closer to the optical inversion systems 30L, 30R than the holders 42L, 42R.

Figure 8:
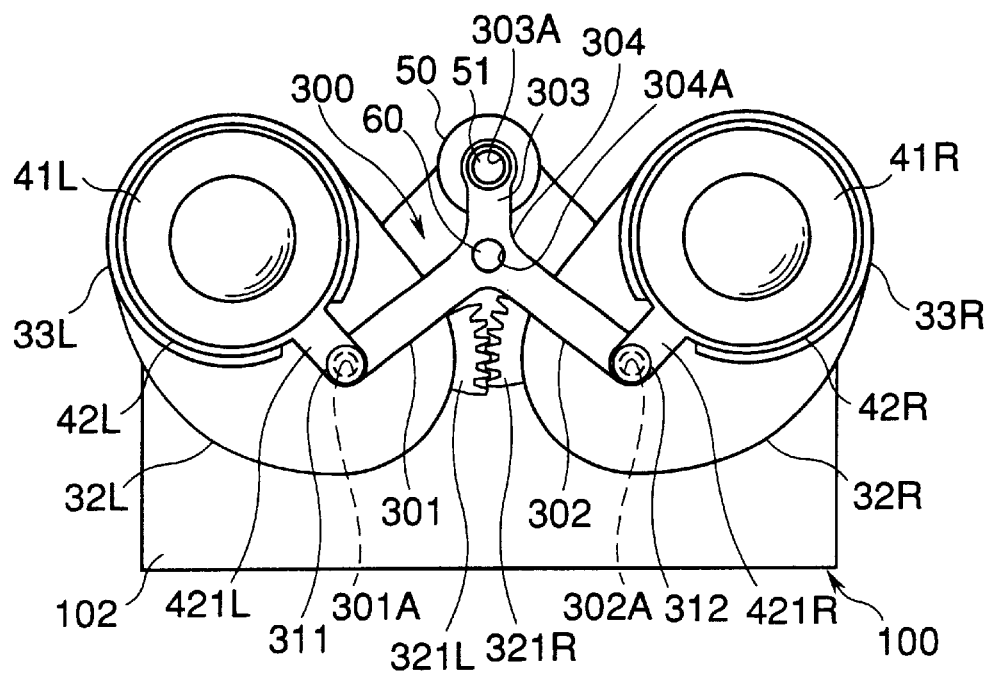
FIG. 8 is a front view of a connecting bar when an interpupillary distance of the eyepieces is increased to the maximum.

FIG. 8 is a front view of the connecting bar 300, viewed from the eyepiece groups 40L, 40R. The connecting bar 300 comprises of three arms 301, 302 and 303 that extend radially. The connecting bar 300 is an approximately Y-shaped figure, viewed from the eyepiece groups 40L, 40R. A hole 301A is formed at a free end of the arm 301, and a hole 302A is formed at a free end of the arm 302. The holders 42L and 42R are respectively supported by the holes 301A and 302A. The center of the hole 301A lies on the extension line of the optical axis OL of the objective lens 10L, and the center of the hole 302A lies on the extension line of the optical axis OR of the objective lens 10R.

The holder 42L includes a projecting bar 421L which is unitarily formed on the outer surface thereof. A hole, the diameter of which is slightly larger than the diameter of the hole 301A of the arm 301, is formed at the end of the projecting bar 421L. Similarly, the holder 42R includes a projecting bar 421R which is unitarily formed on the outer surface thereof. A hole, the diameter of which is slightly larger than the diameter of the hole 302A of the arm 302, is formed at the end of the projecting bar 421R.

A pin 311 is inserted through the hole 301A and the hole of the projecting bar 421L. The head of the pin 311 is in contact with the surface of the projecting bar 421L, situated at the eyepiece side. The pin 311 is fixed to the hole 301A and engaged with the hole of the projecting bar 421L such that the projecting bar 421L is rotatable around the center of the hole of the projecting bar 421L. Similarly, a pin 312 is inserted through the hole 302A and the hole of the projecting bar 421R. The head of the pin 312 is in contact with a surface of the projecting bar 421R, situated at the eyepiece side. The pin 312 is fixed to the hole 302A and engaged with the hole of the projecting bar 421R such that the projecting bar 421R is rotatable around the center of the hole of the projecting bar 421R. The arm 301 is in contact with the surface of the projecting bar 421L, situated at the object side, and the arm 302 is in contact with a surface of the projecting bar 421R, situated at the object side (see FIG. 1) Namely, the projecting bar 421L is clamped by the head of the pin 311 and the arm 301, being supported by the arm 301 so as to be able to rotate around the optical axis OL of the objective lens 10L, and the projecting bar 421R is clamped by the head of the pin 312 and the arm 302, being supported by the arm 302 so as to be able to rotate around the optical axis OR of the objective lens 10R.

Further, an interlocking gear 321L is formed on the outer surface of the prism frame 32L of the eyepiece unit 31L, and an interlocking gear 321R is formed on the outer surface of the prism frame 32R of the eyepiece unit 31R. The outer surfaces, on which the interlocking gears 321L and 321R are respectively formed, face each other. Hence, the interlocking gears 321L and 321R are engaged with each other.

As described above, the mounting frame 35L of the left eyepiece unit 31L is rotatably engaged with the mounting hole 102L of the mounting base 100, and the mounting frame 35R of the right eyepiece unit 31R is rotatably engaged with the mounting hole 102R of the mounting base 100. On the other hand, the holder 42L is supported so as to be able to rotate around the optical axis OL of the objective lens 10L, and the holder 42R is supported so as to be able to rotate around the optical axis OR of the objective lens 10R. Namely, the left eyepiece unit 31L is rotatable around the optical axis of OL of the objective lens 10L as a whole, and the right eyepiece unit 31R is rotatable around the optical axis of OR of the objective lens 10R as a whole, further the rotational movement of the left eyepiece unit 31L and the rotational movement of the right eyepiece unit 31R are interlocked. Accordingly, the distance between the optical axis OL' of the eyepiece group 40L and the optical axis OR' of the eyepiece group 40R can be adjusted by adding an external force around the optical axes to the left and right eyepiece units 31L and 31R, maintaining the positional relationship between the objective lenses 10L and 10R. Namely, the interpupillary adjustment which is suitable for all users, can be carried out.

Figure 9:
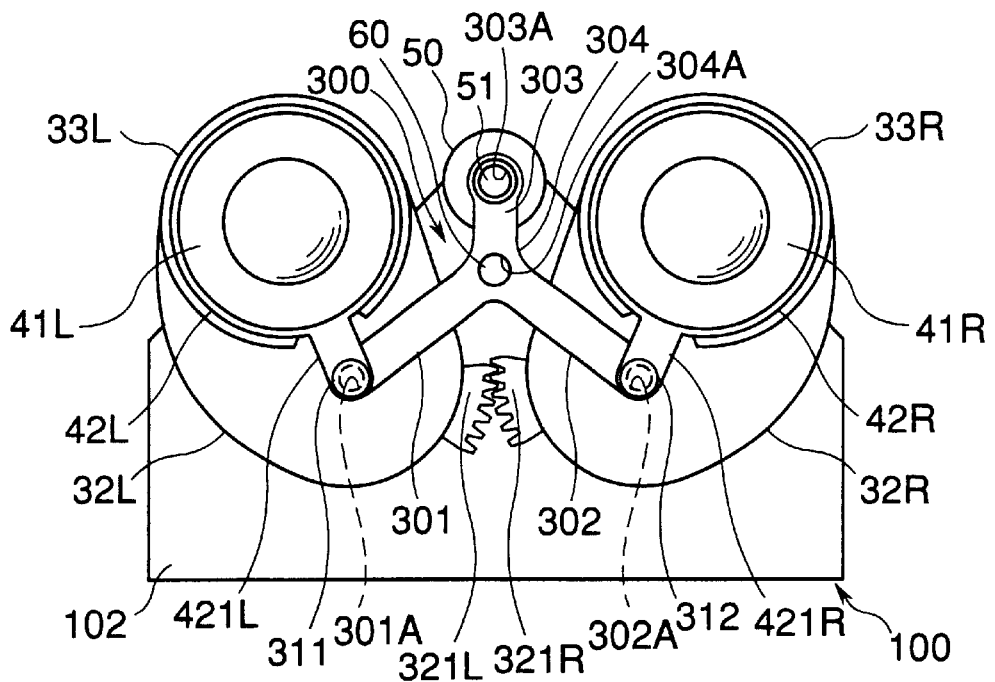
FIG. 9 is a front view of the connecting bar when the interpupillary distance of the eyepieces is decreased to the minimum.

For example, when an external force is applied to the binocular 1 such that the left eyepiece unit 31L is rotated counterclockwise and the right eyepiece unit 31R is rotated clockwise to the position shown in FIG. 8, the interpupillary distance is increased to maximum. Then, the left and right eyepiece units 31L and 31R are interlocked and respectively rotated around the optical axes OL and OR of the objective lenses 10L and 10R. Conversely, when an external force is applied such that the left eyepiece unit 31L is rotated clockwise and the right eyepiece unit 31R is rotated counterclockwise to the position shown in FIG. 9, the distance between the optical axes of the eyepiece groups 40L and 40R is shortened.

An end portion of the arm 303 of the connecting bar 300 is cylindrical shaped and its center axis extends in a direction along the optical axes OL' and OR' (see FIGS. 1 and 2). A hole 303A is formed within the end portion. A female thread is formed on the inner surface of the hole 303A, with which the rotation ring axle 51 is threadably engaged. Further, a hole 304A is formed at the center 304 of the connecting bar 300, at the junction of the radially extending arms 301, 302 and 303. The guide bar 60 is inserted through the hole 304A.

When the rotation ring 50 is rotated by the user, the rotation ring axle 51 rotates around the center axis thereof, in accordance with the rotation of the rotation ring 50. As described above, the rotation ring axle 51 is fixed by the supporting hole 102A of the mounting base 100 and the reinforcement plate 70, and the rotational movement of the rotation ring axle 51 is not transmitted to the connecting bar 300, since the guide bar 60 is inserted through the hole 304A of the connecting bar 300. Accordingly, the connecting bar 300 moves along the optical axes OL' and OR' in accordance with the rotational movement of the rotation ring axle 51.

For example, if the rotation ring 50 is rotated clockwise, viewed from the eyepiece groups 40L and 40R, the connecting bar 300 is moved along the optical axes OL' and OR' in a direction closer to the objective lenses 10L and 10R. If the rotation ring 50 is rotated counterclockwise, viewed from the eyepiece groups 40L and 40R, the connecting bar 300 is moved along the optical axes OL' and OR', receding from the objective lenses 10L and 10R.

As described above, the projecting bar 421L of the holder 42L is clamped by the head of the pin 311 and the arm 301 of the connecting bar 300, and the projecting bar 421R of the holder 42R is clamped by the head of the pin 312 and the arm 302 of the connecting bar 300. Accordingly, the eyepiece groups 40L and 40R are moved in accordance with the movement of the connecting bar 300 along the optical axes OL' and OR'. Namely, the rotation ring 50 is rotated by a user, the eyepiece groups 40L and 40R are moved along the optical axes OL' and OR', so that a focusing is carried out.

Further, the guide bar 60 parallel to the rotation ring axle 51 is supported by the supporting hole 102B of the mounting base 100 and the reinforcement board 70. Accordingly, the movement of the connecting bar 300 along the optical axes OL' and OR' is smoothly performed.

As described above, according to the present invention, a binocular of biaxial type can be obtained, in which the adjustment of optical axes is facilitated during manufacture.

The present disclosure relates to subject matter contained in Japanese Patent Application No.P11-312908 (filed on Nov. 2, 1999) which is expressly incorporated herein, by reference, in its entirety.

What is claimed is:

1. A binocular, in which an interpupillary distance is adjusted by rotating each of a pair of eyepieces around a corresponding optical axis of optical axes of a pair of objective optical systems, said binocular comprising:

a pair of rotating members that are rotatable for an interpupillary adjustment, each of said rotating members holding a corresponding eyepiece of said pair of eyepieces; and a mounting base including:

a rotating member holding portion that holds said pair of rotating members;

an objective optical systems holding portion that holds said pair of objective optical systems; and a connecting portion that is unitarily formed with said rotating member holding portion and said objective optical systems holding portion, connecting said rotating member holding portion and said objective optical systems holding portion such that said rotating member holding portion and said objective optical systems holding portion are parallel, said rotating member holding portion and said objective optical systems holding portion being a flat board-shaped member, wherein:

first openings are formed in said rotating member holding portion, each of said rotating members being mounted in each of said first openings, second openings are formed in said objective optical systems holding portion, each of said objective optical systems being mounted in each of said second openings, said first openings and said second openings are formed such that: a first rotating member holding portion axis line, perpendicular to said rotating member holding portion, on which a geometric center of gravity of one first opening of said first openings lies, a first objective optical system holding portion axis line, perpendicular to said objective optical systems holding portion, on which a geometric center of gravity of one second opening of said second openings corresponding to said one first opening lies, and a first optical axis of one objective optical system of said objective optical systems which is mounted in said one second opening, are coincident; and a second rotating member holding portion axis line, perpendicular to said rotating member holding portion, on which a geometric center of gravity of another first opening of said first openings, a second objective optical system holding portion axis line, perpendicular to said objective optical systems holding portion, on which a geometric center of gravity of another second opening of said second openings corresponding to said another first opening, and a second optical axis of another objective optical system of said objective optical systems, which is mounted in said another second opening, are coincident, said optical axis of one eyepiece of said pair of eyepieces corresponds to said coincident first optical axis of said one objective optical system and said axis lines of said first rotating member holding portion and said first objective optical system holding portion, and said optical axis of another eyepiece of said pair of eyepieces corresponds to said coincident second optical axis of said another objective optical system and said axis lines of said second rotating member holding portion and said second objective optical system holding portion, and said one eyepiece and said another eyepiece are configured to rotate about said corresponding optical axes in an interlocking relationship.

2. The binocular of claim 1, wherein said connecting portion is a flat board-shaped member, which is parallel to a plane perpendicular to said rotation member holding portion and said objective optical systems holding portion.

3. The binocular of claim 1, wherein said first openings and said second openings are circularly formed.

4. The binocular of claim 3, wherein a radius of said first openings is shorter than a radius of said second openings.

5. The binocular of claim 2, wherein movable optical systems are provided in a space between said rotating member holding portion and said objective optical systems holding portion, said movable optical systems being disposed on said connecting portion.

6. The binocular of claim 5, wherein said movable optical systems are correcting optical systems which correct a focused image tremble, said movable optical systems being two-dimensionally driven on a plane which is perpendicular to the optical axes thereof.

7. The binocular of claim 2, wherein a sectional shape of said mounting base, which is taken along a plane perpendicular to said rotating member holding portion and said objective optical systems holding portion, is almost U-shaped.

8. A binocular which includes a right telescopic optical system and a left telescopic optical system comprises:
   a right rotating member that holds a right eyepiece group of said right telescopic optical system and is rotatable around a right optical axis of a right objective system of said right telescopic optical system;
   a left rotating member that holds a left eyepiece group of said left telescopic optical system and is rotatable around a left optical axis of a left objective system of said left telescopic optical system; and
   a mounting base that includes a first board holding said right rotating member and said left rotating member, a second board holding said right objective optical system and said left objective optical system, and a third board which is unitarily formed with said first board and said second board and connects said first board and said second board such that said first board and said second board are parallel;
   said first board being provided with first circular holes in which said right rotating member and said left rotating member are respectively mounted,
   said second board being provide with second circular holes in which said right objective optical system and said left objective optical system are mounted,
   the rotational movements of said right rotating member and said left rotating member being interlocked, wherein:
      a straight line, connecting a center of one of said first circular holes, in which said right rotating member is mounted, and a center of one of said second circular holes, in which said right objective optical system is mounted, is coaxial with said right optical axis; and
      a straight line, connecting a center of another of said first circular holes, in which said left rotating member is mounted, and a center of another of said second circular holes, in which said left objective optical system is mounted, is coaxial with said left optical axis.

9. The binocular of claim 8, wherein said third board is perpendicular to said first board and said second board.

10. The binocular of claim 9, wherein a radius of said first circular holes is shorter than a radius of said second circular holes.

11. The binocular of claim 9, wherein movable optical systems are provided in a space between said first board and said second board, said movable optical systems being disposed on said third board.

12. The binocular of claim 11, wherein said movable optical systems are correcting optical systems which correct a focused image tremble, said movable optical systems being two-dimensionally driven on a plane which is perpendicular to the optical axes thereof.

13. The binocular of claim 9, wherein a sectional shape of said mounting base, which is taken along a plane perpendicular to said first board and said second board, is almost U-shaped.

14. A method for manufacturing binoculars, each binocular comprising:
   a pair of rotating members that is rotatable for an inter-pupillary adjustment, each of said rotating members holding a corresponding eyepiece of a pair of eyepieces; and
   a mounting base,
   said mounting base including:
      a rotating member holding portion that holds said pair of rotating members;

an objective optical systems holding portion that holds a pair of objective optical systems; and a connecting portion that is unitarily formed with said rotating member holding portion and said objective optical systems holding portion, connecting said rotating member holding portion and said objective optical systems holding portion, such that said rotating member holding portion and said objective optical systems holding portion are parallel, said rotating member holding portion and said objective optical systems holding portion being flat board-shaped members, said method comprising:

positioning a cutting tool spaced from a predetermined axis by a first distance;

abutting said cutting tool against a surface of said objective optical systems holding portion;

forming, in said objective optical systems holding portion, an opening in which one objective optical system of said pair of objective optical systems is mounted, by rotating said mounting base around said predetermined axis;

extending said cutting tool through said formed opening in which said one objective optical system is mounted;

positioning said cutting tool spaced from said predetermined axis by a second distance, said second distance being smaller than said first distance;

abutting said cutting tool against a surface of said rotating member holding portion; and forming an opening in which one rotating member of said pair of rotating members is mounted, in said rotating member holding portion, by rotating said mounting base around said predetermined axis.

15. A method for manufacturing binoculars, each binocular comprising:

a pair of rotating members that is rotatable for an inter-pupillary adjustment, each of said rotating members holding a corresponding eyepiece of a pair of eyepieces; and a mounting base, said mounting base including:

a first board-shaped portion that holds said pair of rotating members;

a second board-shaped portion that holds a pair of objective optical systems; and a connecting portion that is unitarily formed with said first board-shaped portion and said second board-shaped portion, connecting said first board-shaped portion and said second board-shaped portion, such that said first board-shaped portion and said second board-shaped portion are parallel, said method comprising:

abutting a cutting tool against a surface of said objective optical systems holding portion;

forming a first opening, in one portion of said first board-shaped portion and said second board-shaped portion, by rotating said mounting base around a predetermined axis;

extending said cutting tool through said formed first opening;

abutting said cutting tool against a surface of another portion of said first board-shaped portion and said second board-shaped portion; and forming a second opening which is smaller than said first opening, in another portion of said first board-shaped portion and said second board-shaped portion, by rotating said mounting base around said predetermined axis in a similar condition to said first step.

\* \* \* \* \*